United States Patent [19]

Kelland

[11] Patent Number: 5,102,964
[45] Date of Patent: Apr. 7, 1992

[54] CATALYST SUPPORTS

[75] Inventor: John W. Kelland, Nunthorpe, England

[73] Assignee: Imperial Chemical Industries PLC, London, England

[21] Appl. No.: 729,195

[22] Filed: Jul. 12, 1991

Related U.S. Application Data

[62] Division of Ser. No. 442,198, Nov. 28, 1989.

[30] Foreign Application Priority Data

Nov. 28, 1988 [GB] United Kingdom ............... 8827782

[51] Int. Cl.$^5$ .................................... C08F 4/44
[52] U.S. Cl. .................... 526/128; 526/129; 526/351
[58] Field of Search .............. 526/128, 129, 351

[56] References Cited

U.S. PATENT DOCUMENTS 4,829,038 5/1989 Hoppin et al. .................... 526/351

Primary Examiner—Joseph L. Schofer
Assistant Examiner—David Wu
Attorney, Agent, or Firm—Cushman, Darby & Cushman

[57] ABSTRACT

Silica supports for use in the production of catalysts for olefin polymerization, in particular where the surface is substantially free from reactive hydroxyl groups, comprise $(RCOO)_2Mg$ deposited on the surface of the silica and/or groups of the general formula $R(CO_2MgO)_n$ linked to surface silicon atoms, where R is a hydrocarbon radical and $n = 1$ to to 6. Such supports are suitable for the production of stereospecific catalysts of high activity in the polymerization of olefins especially propylene.

24 Claims, No Drawings

CATALYST SUPPORTS

This is a division of application Ser. No. 07/442,198, filed Nov. 28, 1989.

This invention relates to surface treated particulate silica which can be used as a support for catalysts for olefin polymerisation, to processes for the manufacture and use in the production of catalysts for olefin polymerisation of such treated silicas and to the use of such catalysts in olefin polymerisation processes.

It is known to carry out stereospecific polymerisation of olefinically unsaturated monomers, for example, propylene, using transition metal compounds on supports as catalysts. Normally, an organic compound of aluminium and/or of a metal of group IIA of the (Mendeleev) Periodic Table is used as a co-catalyst. Suitable transition metals include titanium, zirconium and vanadium. It has been suggested to use magnesium chloride particles as the support for catalysts of this type, e.g. as described in EP 0045977. Such catalysts can be highly active. However, catalysts on magnesium chloride supports are mechanically fragile and in particular friable, in part because the methods used to make them result in shrinkage of the particles, and the catalysts tend to include catalyst fines which, in polymerisation, give rise to significant amounts of polymer particle fines which need care in processing.

This invention is directed to particulate silica supports which can be used to make mechanically robust catalysts having high activity and sterospecificity in the polymerisation of olefins, particularly propylene.

Accordingly, the present invention provides a particulate silica support of high surface area, in particular one in which the surface is substantially free from reactive hydroxyl groups, and which comprises a compound of the general formula (Ia):

$$(RCOO)_2 Mg \qquad (Ia)$$

deposited on its surface and/or groups of the general formula (Ib):

$$R(CO_2MgO)_n- \qquad (Ib)$$

where

R is a substituted or unsubstituted hydrocarbon radical; and n=1 to 6, preferably 1 or 2, most preferably 1;
linked to surface silicon atoms.

The particulate silica used in making the support will typically have a surface area of from 10 to 2000, more particularly 100 to 1500, and optimally 200 to 1000, $m^2.g^{-1}$. Suitable silicas have a pore volume of 0.5 to 10, desirably 1 to 5, and optimally 1.5 to 3, $ml.g^{-1}$ and an average pore diameter of 1 to 1000 nm, preferably 1 to 100 nm, and optimally 5 to 50 nm. "Average pore diameter" is as calculated according to the method of W B Innes, Analytical Chemistry 28 332 (1956) using the empirical formula:

$$d = 4000 \, v/s$$

where
 d = pore diameter (nm);
 v = pore volume ($ml.g^{-1}$); and
 s = surface area ($m^2.g^{-1}$).

The particles of silica are desirably of substantially spheroidal, for example substantially spherical, particles. Also it is desirable that at least 90% by weight of the particles have a diameter of from 1 to 1000 μm, particularly 10 to 500 μm, and most desirably 20 to 100 μm as measured by (for example) sieving or analysis by laser light scattering.

The support may conveniently be prepared by the reaction of the silica and a magnesium compound of the general formula (II):

MgAB where

A is a group R' or OR' in which R' is a substituted or unsubstituted hydrocarbon radical preferably having 1 to 5 carbon atoms; and B is a halogen atom or a substituted or unsubstituted hydrocarbon radical preferably having 1 to 15 carbon atoms;

and contacting the product with a carboxylic acid of the general formula:

$$R(CO_2H)_n$$

where R and n are as defined above.

Particularly useful supports are provided when A and B are each independently substituted or unsubstituted hydrocarbon radicals, preferably alkyl radicals having 1 to 10, more preferably 4 to 8, carbon atoms.

Any mono- or poly-carboxylic acid having 1 to 6 carboxylate groups, may be used. The group R may be any substituted or unsubstituted hydrocarbon radical but is suitably a hydrocarbon radical having 1 to 30 carbon atoms, more particularly 1 to 20 carbon atoms, most desirably 1 to 15 carbon atoms. Where, in the acid $R(CO_2H)_n$, n is 2 or more, the carboxylate species on the surface of or within the pores of the silica substrate may include magnesium inner salts, such as can be expressed by the formula:

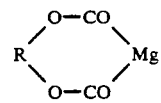

which may retain some free carboxylate groups, especially if n is 3 or 5. Also for such acids, particularly where n is at least 3, the treated silica may include species having both magnesium inner salt groups and magnesium silicate carboxylates as can be expressed by the formula:

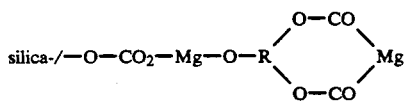

Such inner salts are included within the general formula (Ia) and inner salt silicate carboxylates within the general formula (Ib). Although n can be greater than 1, we have obtained best results when n is 1 i.e. using monocarboxylic acids. We have obtained particularly good results when the group R is an unsubstituted or substituted aliphatic group, especially a cycloaliphatic group. Specific suitable monocarboxylic acids, $RCO_2H$, include cyclohexane, 1-methylcyclohexane, cycloheptane, cyclopentane, cyclobutane, cyclopropane, carboxylic acids, cyclohexyl and phenyl acetic acids and 1,4- dihydro-2-methylbenzoic acid (2-methylcyclohexa-2,5-diene carboxylic acid).

The reaction is preferably carried out by contacting the silica with the magnesium compound, MgAB, in the presence of an inert solvent and thereafter contacting the product with a carboxylic acid.

The first stage is desirably carried out at a fairly low temperature as the reaction between the magnesium compound, MgAB, and the silica is exothermic. The reaction temperature can be at or near ambient temperature particularly from 10° to 30°, or can be sub-ambient particularly in the range −40° to 10° C., especially −30° to −10° C. Sub-ambient temperatures are useful in slowing the reaction down and thus to have greater control over it. Also, it can aid in reducing the production of detached particles of magnesium compound which, in later processing can give rise to very fine particles of catalyst, which in turn give rise to polymer fines, making it liable to dusting, unless it is consolidated e.g. by extrusion and pelleting.

The second stage can be carried out at ambient or at sub- or super-ambient temperatures, particularly in the range −40° to 100° C. Sub ambient temperatures, especially in the range −30° to 0° C., can be used to slow the reaction down to maintain close control, but this is not as important as in the first stage. At higher temperatures e.g. in the range 50° to 100° C., especially 80° to 90° c., the reaction proceeds faster.

The proportion of magnesium compound which is used is preferably 0.0001 to 1 mol for each mole of silica, more preferably 0.1 to 0.5 mol. The molar ratio of carboxylate groups to Si atoms present is preferably 1:500 to 2:1 and more preferably 1:5 to 1:1.

It is desirable that the silica support of the invention has a surface that is substantially free of reactive hydroxyl groups, by which we mean that there are no free reactive hydroxyl groups on the accessible surface of the silica. Highly porous silicas typically have some pores that are very minute, so small that even fairly small molecules cannot enter them. In making the support of the present invention, the reagents may not be able to enter such ultra fine pores so the internal surface of such pores will remain unaltered and, we assume there will be some free hydroxyl groups in those pores (we cannot be sure as these pores are not readily accessible for inspection). These hydroxyl groups in ultra fine pores are relatively inaccessible and do not seem to adversely affect the support of the invention and catalysts made from it.

The invention includes a polymerisation catalysts, particularly for the polymerisation of olefins, especially alpha-olefins and very especially propylene, which comprises the reaction product of
(i) a compound of a transition metal of Group IVA of the Periodic Table, particularly titanium;
(ii) a silica support according to the invention; and
(iii) a Lewis base of the general formula (III):

where
Ar is a residue of an aromatic hydrocarbon;
$R^1$ independently is a hydrogen atom or a substituted or unsubstituted hydrocarbon radical, a halogen atom, or a group $OR^3$, (where $R^3$ is a substituted or unsubstituted hydrocarbon radical, preferably an alkyl group having 1 to 4 carbon atoms) and is preferably a hydrogen atom, or an alkyl or alkoxy group containing 1 to 10 carbon atoms;
each $R^2$ independently is a substituted or unsubstituted hydrocarbon radical, preferably an alkyl group, containing 1 to 12 carbon atoms;
a is zero or an integer, and is preferably 0 or 1;
b is an integer, preferably 1 or 2.

This transition metal polymerisation catalyst will typically be used in combination with a co-catalyst and an electron donor to form a catalyst system and that this catalyst system has a high activity and sterospecificity when used for the polymerisation of alpha-olefin monomers.

Accordingly, the invention includes a polymerisation catalyst system, particularly for the polymerisation of olefins, especially alpha-olefins and very especially propylene, which comprises;
(A) the reaction product of
(i) a compound of a transition metal of Group IVA of the Periodic Table, particularly titanium;
(ii) a silica support according to the invention ; and
(iii) a Lewis base of the general formula (III):

where
Ar is a residue of an aromatic hydrocarbon; each $R^1$ independently is a hydrogen atom or a substituted or unsubstituted hydrocarbon radical, a halogen atom, or a group $OR^3$, (where $R^3$ is a substituted or unsubstituted hydrocarbon radical, preferably an alkyl group having 1 to 5 carbon atoms) and is preferably a hydrogen atom, or an alkyl or alkoxy group containing 1 to 10 carbon atoms;
each $R^2$ independently is a substituted or unsubstituted hydrocarbon radical, preferably an alkyl group, containing 1 to 12 carbon atoms;
a is zero or an integer, and is preferably 0 or 1;
b is an integer, preferably 1 or 2;
(B) an organic compound of aluminium and/or a metal of group IIA of the Periodic Table; and
(C) a Lewis base compound which is an organic silicon compound containing one or more Si—$OR^4$, Si—$OCOR^4$ or Si—$NR^4$ bonds, where each $R^4$ independently is a hydrocarbon radical which may be substituted with one or more halogen atoms and/or oxyhydrocarbon groups, and is preferably a C1 to 10 alkyl, a C3 to 7 cycloalkyl or aryl, particularly phenyl group.

For convenience the term "transition metal" is used herein to mean a transition metal of Group IVA of the (Mendeleev) Periodic Table.

In the general formula (III), the group Ar typically is a mono- or di-valent residue derives from an aromatic hydrocarbon such as benzene or naphthalene. If the group Ar is a divalent residue it may be, for example, a divalent benzene residue wherein the unoccupied valencies are in the ortho- or para-position to each other. It is preferred that at least one of the groups $R^2$ is a hydrocarbon radical. If the value of b is greater than one, the groups $R^2$ may be the same or different, for example one group $R^2$ may be a hydrogen atom and at least one other group $R^2$ a hydrocarbon radical, particularly an alkyl group.

Lewis base (III) is suitable methyl, ethyl, or butyl benzoate, ethyl 4-methoxybenzoate, methyl 4-methylbenzoate, or, and preferably, the di-esters of phthalic acid such as dimethyl phthalate, diethyl phthalate, di-n- propyl phthalate di-n-butyl phthalate, di-iso-butyl phthalate and di-2-ethylhexyl phthalate.

Suitable organic silicon compounds for component (C) include dialkyl dialkoxy silanes, preferably di-(C1 to 10)alkyl dimethoxy silanes, for example di-iso-propyl-dimethoxy-silane. Other organic silicon compounds which may be used include phenyltriethoxysilane, diphenyldi-iso-butoxysilane, diphenyldimethoxysilane and iso-butyl-triethoxysilane.

The transition metal is preferably titanium. It is particularly preferred that the transition metal compound used to obtain the transition metal catalyst composition (A) is a titanium halide for example a tri- or tetra-halide, especially a chloride for example titanium tri- or tetra-chloride.

The transition metal catalyst composition (A) can be made by reacting, at a temperature of from 0° to 200° C. particularly 50° to 150° C., and especially 50° to 100° C., a compound of the transition metal with a silica support according to the invention. We have obtained best results using a reaction temperature of 80° to 90° C.

The reaction is very conveniently and preferably carried out by suspending the silica support in a liquid medium which is, or which contains, a transition metal compound, especially a titanium chloride. The proportion of the transition metal compound which is used is desirably at least 1 mol and very desirably at least 5 mol, for example 10 to 50 mol, of the transition metal compound for each mole of the silica support.

The silica support may be contacted with the Lewis base (III) before or after effecting the reaction with the transition metal compound. The molar ratio of Lewis base (III) added to the silica support may be up to 5:1, but is preferably from 0.1:1 to 1:1, and is especially not more than 0.5:1, for example about 0.33:1. The amount of the Lewis base in the final catalyst will typically be rather less than these particularly because some, usually most, of the Lewis base (III) will be removed by washing the catalyst (done to remove excess material and to remove catalyst fines if any). Typical molar proportions of the Lewis base (III) to the silica in the catalyst are in the approximate range 0.005 to 0.02 moles per mole of silica i.e. only about from 2 to 5% of the Lewis base is retained.

When the reaction has been completed, the excess transition metal compound is preferably removed from the reaction mixture whilst still at an elevated temperature, particularly at a temperature of at least 70° C. The excess liquid can be removed using any suitable technique, for example filtration, decanting, siphoning or centrifuging and the product can usefully be washed at or near the reaction temperature.

Component (B) of the catalyst system may be an organic magnesium compound or a mixture or complex thereof with an organic aluminium compound. Alternatively, a complex of a metal of Group IA with an organic aluminium compound may be used, for example, a lithium aluminium tetra-alkyl. However, it is preferred to use an organic aluminium compound and in particular it is preferred to use a tri-hydrocarbyl aluminium compound such as an aluminium trialkyl compound, particularly one in which each alkyl group independently contains 1 to 10 carbon atoms, for example, aluminium triethyl, aluminium triisobutyl or aluminium trioctyl.

In the polymerisation catalyst system, the molar ration of component (B) to transition metal in component (A) will generally be at least 1:1 and desirably at least 10:1, but not more than 250:1. The optimal ratio is usually in the range 10:1 to 60:1. The total amount of the silicon Lewis base component (C) should not generally exceed 5 times the amount of component (B) of the catalyst system. The molar ration of component (C) to component (B) will typically be from 0.01:1 to 0.5:1, and desirably from 0.05:1 to 0.4:1.

The catalyst system of the present invention may be obtained by pre-mixing components (A),(B) and (C) before introducing the catalyst system into a polymerisation process. Alternatively, all the catalyst components may be introduced separately into a polymerisation process.

The invention further includes a process for the production of a polymer or copolymer of an unsaturated monomer, in particular an olefin, wherein at least one unsaturated hydrocarbon monomer is contacted under polymerisation conditions with a polymerisation catalyst as hereinbefore described.

The monomer to be polymerised will typically be an olefin, particularly in aliphatic mono-olefin monomer which contains 2 to 10 carbon atoms. Most usually the monomer will be of the formula $CH_2=CHR^5$ where $R^5$ is a hydrogen atom or a hydrocarbon radical especially an alkyl, particularly a C1 to C8 and especially a methyl, group or an aryl, especially a phenyl, group. Particular monomers which may be polymerised or copolymerised by the process of the present invention include ethylene, butene-1, pentene-1, hexene-1, 4-methylpentene-1, styrene, 1,3-butadiene and especially propylene.

The monomers may be homopolymerised or may be copolymerised together. Copolymerisation can be performed using a mixture of monomers which has substantially the same composition throughout the polymerisation process. Alternatively, a sequential polymerisation process, such as described in British patents 970478 and 970479 may be used, for example by polymerising propylene alone and thereafter polymerising a mixture of propylene and ethylene to give a polymer product which contains from 2 up to 30% by weight of ethylene residues.

The present invention is particularly suitable for the polymerisation of propylene, and especially for the polymerisation or copolymerisation of propylene in the gas phase.

Using the process of the present invention with a titanium chloride based catalyst system, it is possible to obtain, as a direct (ex reactor) product of polymerisation, a propylene polymer having a titanium content of not more than 10 parts per million (ppm) by weight and/or a chlorine content which is not more than 100 ppm, particularly not more than 50 ppm.

The process of the invention can be used to make propylene homopolymers containing less than 4% and in some cases less than 1.5% by weight of atactic polymer. The proportion of atactic polymer is commonly assayed by the percentage of the polymer which is soluble in suitable organic solvents. Boiling heptane and xylene have been used as solvents for this measurement. In trying to make isotactic polypropylene it is desirable that not more than 7%, and especially less than 5%, e.g. less than 3%, by weight of polymer is atactic. The process of the invention is easily capable of matching such specifications. The amount of atactic polymer in the product is an inverse measure of the stereoregularity of the product and the stereospecificity of the catalyst.

Polymerisation in the gas phase may be effected using conditions which are such that the monomer is at a temperature and partial pressure which are close to its dew point, for example, as described in more detail in British patent specification 1532445. Gas phase polymerisation can be performed using any technique suitable for effecting a gas-solid reaction, such as a fluidised-bed reactor system, a stirred-bed reactor system or a ribbon-blender type of reactor.

It is desirable to effect the polymerisation using substrate reagents, that is monomer and possibly diluent, which have a high degree of purity, for example, a monomer which contains less than 5 ppm by weight of water and less than 1 ppm by weight of oxygen. Materials having a high degree of purity can be obtained by processes such as those described in British Patent Specifications 1111493, 1226659 and 1383611.

The polymerisation may be effected either in a batch manner or on a continuous basis. When carrying out polymerisation on a continuous basis, the organic metal compound (B) and the organic silicon compound (C) may be pre-mixed just before being introduced into the polymerisation reaction vessel.

It has been found that it is often advantageous to perform a pre-polymerisation step in which the monomer is fed to the catalyst system to produce a "pre-polymer" at a temperature lower than that of the main polymerisation. Typically, 1 to 100 g of polymer is produced at this stage for each gram of the transition metal catalyst composition (A).

The polymerisation can be effected in the presence of a chain transfer agent such as hydrogen in order to control the molecular weight of the polymer product. The proportion of chain transfer agent used will be dependent on the polymerisation conditions and on the particular monomer or monomer mixture which is being polymerised.

The polymerisation can be effected under any conditions which have been previously proposed for effecting the polymerisation of olefin monomers. Thus, ethylene polymerisation may be effected at pressures of up to 3000 kg.cm$^{-2}$ (ca. 294 MPa), and at such pressures the polymerisation temperature may be as high as 300° C. However, it is preferred to carry out the polymerisation at comparatively low pressures and temperatures, particularly for the production of polymers of the higher olefins (including propylene) which have a high stereoregularity. More specifically, the polymerisation may be effected at pressures which are conveniently in the range from 1 up 100 kg.cm$^{-2}$ (ca. 98 kPa to 9.8 MPa), preferably at a pressure of 1 to 50 kg.cm$^{-2}$ (ca. 98 kPa to 4.9 MPa), more preferably at pressures in the range from 5 to 40 kg.cm$^{-2}$ (ca. 0.49 to 3.92 MPa).

The polymerisation temperature used will be dependent in part on the particular polymerisation technique being used. Thus, it is possible to use polymerisation temperatures in excess of the melting point of the polymer and such conditions may be used in the polymerisation, or copolymerisation, of ethylene in the presence of a hydrocarbon liquid which can act as a solvent for the polymer formed. However, in general, it is preferred to use temperatures below the melting temperature of the polymer formed and in particular it is preferred to use temperatures of not more than 100° C. The polymerisation temperature is typically in the range 40° C. to 100° C.

In the polymerisation of olefins using ionic (Ziegler-Natta) catalysts, it is known that the particle form of the polymer produced tends to replicate that of the particles of catalyst. (Polyethylene is an exception for polymerisations at ambient temperatures or above.) This replication seems to arise from the polymer growing from the catalystic sites over the surface of the catalyst. Polymers made using the catalyst of this invention are typically produced as particles having dispersed within them catalyst residues in the form of a fine three dimensional network, which appears cobweb-like under examination using a scanning electron microscope. This network structure of catalyst residues is believed to arise as a result of polymer growth from catalytic sites fragmenting the particles of catalyst. It is a particular advantage of the support, catalyst and catalyst system of this invention that this replication effect can be controlled relatively easily. This is possible because the size and shape of the catalyst particles is determined by the size and shape of the silica particles used to make the support as the support does not change shape or size e.g. by shrinking, significantly (or at all so far as we have observed) during manufacture of the support catalyst. The silica particles are relatively large and robust which makes selection by size relatively straightforward and provides resistance to the generation of fines.

It is known in the art to control (or at least fairly accurately predict) the productivity of a catalyst i.e. the amount of polymer that, in manufacture, is synthesised from a given quantity of catalyst. (Typical figures for polypropylene are in the range 5 to 20 kg of polymer per gram of catalyst, in a single reactor system.) It is thus practical, by using this invention, to predetermine the particle shape, size, and size distribution of the particles of polyolefin, especially polypropylene, product by appropriate selection of the size and shape of the silica particles used to make the support. This represents a significant practical advantage over catalysts supported on magnesium chloride supports.

The following Examples illustrate the invention. All parts and percentages are by weight unless otherwise stated.

In the examples, all operations are effected under an atmosphere of essentially oxygen and water free nitrogen unless otherwise stated. All the glass apparatus was dried in an air oven at 120° C. for at least one hour and purged with nitrogen before use. The silica used was pre-dried at 180° C. under vacuum for four hours.

Materials

The grades of silica used were GD grades supplied by Grace Davison, Grace Gmbh—Werk Worms, Postfach 1445, In der Hollerhecke, 6250 Worms, West Germany. The grades used were:

GD 952 has a surface area of 300 m$^2$.g$^{-1}$, a pore volume of 1.65 ml.g$^{-1}$, an average pore diameter of 22 nm and a particle size range of from 20 to 80 μm; and GD 332 has a surface area of 320 m$^2$.g$^{-1}$, a pore volume of 1.75 ml.g$^{-1}$, an average pore diameter of 22 nm and a particle size range of from 20 to 60 μm.

EC 180 is an aliphatic hydrocarbon diluent consisting essentially of dodecane isomers and having a boiling point in the range 170° C. to 180° C.

The propylene used in the exemplified polymerisation reactions for was propylene of commercial purity purified further by passing the gas through a column containing granules of Alcoa F1 alumina at ambient temperature.

Test and analytical Methods

Melt Flow Index (MFI)—This was measured by ASTM Test Method D1238/70, using a temperature of 190° C. and a weight of 10 kg (to give a force of ca.98N). Results are quoted in grams per 10 minutes [g.(10 min)$^{-1}$].

Atomic Analysis—Residual titanium (Ti), aluminium (Al) and chlorine (Cl) (from the catalyst) in the polymer were measured using neutron activation analysis on polymer powders and the results are given in parts per million (ppm) by weight on the total polymer product (polymer+catalyst residues).

Flexural Modulus (FM)—This was measured using a cantilever beam apparatus as described in Polymer Age, March 1970, pages 57 and 58 with results expressed in units of giga Pascals (GPa).

The method is summarised as follows:

The deformation of a test strip of dimensions ca. 150×19×1.6 mm, (prepared as described below) at 1% skin strain after 60 seconds at 28° C. and 50% relative humidity was measured. The test strip was prepared as follows:

23 g of the polymer were mixed with 0.1% by weight of an antioxidant ('Topanol' CA), and the mixture was added to a Brabender Plasticiser, at 190° C. 30 rpm (0.5 Hz) and under a load of 10 kg (ca. 98N) to convert it to a crepe. The crepe was placed within a template, between aluminium foil and pressed by means of an electric Moore press at a temperature of 250° C. The pressing was pre-heated for a period of 6 minutes, under just enough pressure to make the polymer flow across the template, that is an applied force of about 1 tonne (ca. 9.8 kN). After the pre-heat period, the applied force was raised to 15 t (ca. 147 kN) in 5 t increments, degassing (that is releasing pressure) every 5 t. After 2 minutes at 15 t, the press was cooled by means of water for 10 minutes or until ambient temperature was reached. The plaque obtained was then cut into the test strips. Duplicate strips of each polymer were placed into an annealing oven at 130° C. and after 2 hours at this temperature the heat was switched off and the oven cooled to ambient temperature at 15° C. per hour.

Hot heptane solubles (HHS)—This is the percentage (by weight) of the polymer which is soluble in boiling heptane (petroleum fraction). It is performed by extracting a sample of polymer by Soxhlet extraction with the boiling heptane for ca. 18 hours. The amount of material which dissolves is determined by measuring the volume of the extract, evaporating samples (of known volume) of the heptane extract and weighing the residue. The amount dissolved is calculated and expressed as a percentage of the starting quantity of polymer.

Xylene Solubles (Xys)—This is the percentage (by weight) of the polymer which is soluble in xylene. The method used FDA (US Food and Drug Administration) method 177.1520. It involves dissolving a sample of polymer (2 g for polypropylene homopolymer) in 100 ml of hot (boiling) xylene, cooling the solution to 25° C., separating the precipitated material from the remaining solution and measuring the material in solution as described above for the HHs test. The mixture is usually held at 25° C. for at least 12 hours to ensure equilibration of solution and precipitate. The amount dissolved is calculated and expressed as a percentage of the starting quantity of polymer.

Bulk density (BD)—This was measured in by adding polymer to a pre-weighed 100 ml measuring cylinder (to the 100 ml mark) and noting the increase in weight. The bulk density of the polymer in b.1$^{-1}$ is obtained by multiplying the increase in weight by 10.

Fines—Were measured by sieving a representative sample of polymer to separate the fraction less than 0.5 mm in size. The result is the weight % based on the polymer sample.

Catalyst Analysis (a) A 10 ml aliquot of catalyst slurry the product of (e.g. stage ii of Example 1) was shaken with 3M sulphuric acid (100 ml) and the organic and aqueous layers separated. The organic layer was analysed for ester content by gas liquid chromatography and the aqueous layer analysed for titanium content by spectrophotometry, magnesium content by atomic absorption, chlorine content by silver nitrate titration and silica content by filtration and thermolysis.

(b) Two 10 ml aliquots of catalyst slurry were taken. The first aliquot was shaken with 3M sulphuric acid (100 ml) and analysed for titanium, magnesium, chlorine and silica content as described above in method (a). The second aliquot was shaken with isopropyl alcohol (30 ml) and diluted further with methanol (60 ml). This solution was filtered and the filtrate analysed for ester content by gas liquid chromatography.

Yield—This was determined from the ratio of chlorine in the ex reactor polymer to that in the catalyst system (determined from catalyst consumption and analysis) and is expressed in kg(polymer).g$^{-1}$(catalyst).

EXAMPLE 1 i Preparation of silica support

Dibutyl magnesium (60 ml of a 0.7M solution in heptane; 5.8 g, 42 mmol) was added to a stirred slurry of silica, grade GD 952, (20 g, 330 mmol) in toluene (100 ml) at 25° C. and the mixture stirred at 25° C. for 20 minutes. Cyclohexanecarboxylic acid (10.2 g, 80 mmol) was added, the mixture heated to 84° C. and held at 84° C. with stirring for 30 minutes. Stirring was stopped, the solid allowed to settle, the supernatant liquor was decanted off and the residual slurry of silica support (31.7 g) in toluene/heptane (60 ml) allowed to cool to ambient temperature.

ii Preparation of silica supported catalyst

Titanium tetrachloride (200 ml, 345 g, 1.82 mol) was added to a slurry of silica support (31.7 g) in toluene/heptane (60 ml) prepared as described in stage i above, at a temperature of 25° C. with stirring and the mixture was then heated to 84° C. Diethyl phthalate (6 ml of a 1M solution in toluene; 1.3 g, 6 mmol) (DEP) was added and the stirred mixture held at 84° C. for 1 h. Stirring was stopped, the catalyst allowed to settle, supernatant titanium tetrachloride was decanted off and the residual catalyst washed at 84° C. with toluene (2×200 ml) and heptane (3×200 ml). The residual slurry of catalyst (29 g) in heptane (60 ml) was diluted with fresh heptane (50 ml) and allowed to cool to ambient temperature.

The catalyst obtained was analysed by method (a) above to give:

| Ti | Mg | Cl | DEP | SiO$_2$ | (% w/w) |
|---|---|---|---|---|---|
| 7.3 | 2.3 | 19.4 | 3.1 | 68.0 | | iii Polymerisation of liquid propylene

Liquid propylene (5.5 l, 67 mol) was added to a stirred slurry of triethylaluminium (10 ml of a 1M solution in heptane; 1.14 g, 10 mmol), di-iso-propyldimethoxysilane (1 ml of a 1M solution in heptane; 0.18 g, 1 mmol) and a catalyst (100 mg) slurry in heptane (2 ml) prepared in stage ii above, at 25° C. in a thrice propylene purged vessel. The mixture was stirred at 25° C. for 15 minutes and then heated to 70° C. over 15 minutes. A portion of hydrogen (2 mmol) was added at each 15 minute interval and the mixture was stirred at 70° C. for 1 h (hour). The vessel was vented to leave polypropylene (1 kg) as a powder.

The powder was tested by the methods described above and the results are set out in Table 1 below.

EXAMPLE 2

Example 1 was repeated with variation but using the GD 332 grade of silica for the GD 952 grade used in Example 1.

The properties of the polymer products obtained are set out in Table 1 below.

EXAMPLES 3 TO 12

Example 1 was repeated but using various carboxylic acids for the cyclohexane carboxylic acid used in Example 1 to obtain a number of catalysts. Somewhat different reaction conditions were used as follows:

Dibutyl magnesium (60 ml of a 0.7M solution in heptane; 5.8 g, 42 mmol) was added to a stirred slurry of silica, grade GD 952, (20 g, 333 mmol) in EC180 (300 ml) at 25° C. and the mixture stirred at 25° C. for 1 h. Stirring was then stopped and the solid allowed to settle. The supernatant liquor was decanted off, the residual slurry washed with C180 (300 ml) and then re-slurried in fresh EC180 (300 ml). The carboxylic acid (84 mmol) was added, the mixture heated to 98° C. and held at 98° C. for 1 h with stirring. The stirring was then stopped, the solid allowed to settle, the supernatant liquor decanted and the residual slurry of silica support allowed to cool to ambient temperature. Titanium tetrachloride (200 ml, 346 g, 1.82 mol) was added and the mixture heated with stirring to 80° C. Diethylphthalate (3 ml of a 1M solution in toluene; 0.66 g, 3 mmol) was then added dropwise and the mixture heated to 98° C. and held at 98° C for 30 minutes with stirring. The stirring was then stopped, the supernatant liquor decanted off, the residual catalyst was washed at 98° C. with toluene (2×400 ml), EC180 (2×400 ml) and allowed to cool to ambient temperature.

The catalysts obtained were analysed by method (b) described above and the results of the analysis are set out in Table 2a below.

The catalysts were used to make polypropylene by the polymerisation method set out in stage iii of Example 1, but substituting the catalysts made in this example for that used in Example 1. The polymers were analysed and tested as described above and the results are given in Table 2b below.

EXAMPLES 13 AND 14

Example 1 was repeated but varying the reaction temperature used in stages i and ii as compared with those used in Example 1 and the catalysts obtained were used to polymerise propylene as described in stage iii of Example 1. The properties of the polymer products obtained are set out in Table 3 below which includes the equivalent results on the polymer obtained in Example 1.

EXAMPLES 15 TO 17

Example 1 was repeated but varying the phthalate ester used in stage ii and the catalysts obtained were used to polymerise propylene as described in stage iii of Example 1. The properties of the polymer products obtained are set out in Table 4 below which includes the equivalent results on the polymer obtained in Example 1.

EXAMPLES 18 TO 20

Example 1 was repeated but varying the quantity of diethylphthalate (DEP) used in stage ii and the catalysts obtained were used to polymerise propylene as described in stage iii of Example 1. The properties of the polymer products obtained are set out in Table 5 below which includes the equivalent results on the polymer obtained in Example 1.

EXAMPLES 21 TO 27

Example 3 was repeated but using various silanes for the di-iso-propyldimethoxysilane used in Example 3. The results of testing the polymers produced are set out in Table 6 below. In Table 6 the following abbreviations are used:

| Pr   | n-propyl   | t-Bu | tertiary-butyl |
|------|------------|------|----------------|
| i-Pr | iso-propyl | c-Pe | cyclopentyl    |
| Bu   | n-butyl    | c-He | cyclohexyl     |
| i-Bu | iso-butyl  | Ph   | phenyl         |
| Me   | methyl     |      |                |

Example 23 is a near repeat of Example 3; the differences in the test results arises from minor differences in reaction conditions.

EXAMPLES 28 TO 30

Polypropylene was made by a gas phase polymerisation process using catalyst systems of the invention based on the catalyst of Example 3 but using iso-propyl-iso-butyldimethoxysilane. Examples 28 to 30 used respectively di-n-butyl phthalate, diethyl phthalate and dimethyl phthalate as the Lewis bases of the formula (III). The catalyst system was made up to give the ratios of 12 moles of the aluminium alkyl to 1 mole of silane to 6 of titanium (in the catalyst) and a prepolymerisation was carried out to yield 2 g(polymer).g$^{-1}$(catalyst. The catalyst was treated with carbon dioxide to remove the risk of premature polymerisation in the feed to the reactor.

The reactor was a 100 l pilot scale single chamber reactor operating at 80° C. and 32 bar (gauge) (3.2 MPa gauge) having a bed weight of 27 kg and a target production rate of 18 kg.h$^{-1}$ giving an average dwell time of 1.5 h. The feed to the reactor was a dispersion of the prepolymerised catalyst in liquid propylene. Further aluminium alkyl (to give about 100 ppm Al in the polymer) and silane (at an addition rate calculated to give 0.05 mmol.kg$^{-1}$ polymer) was added continuously to the reactor. Polypropylene product was withdrawn from the reactor at a rate (target 18 kg.h$^{-1}$) to give the intended dwell time in the reactor. During reaction hydrogen was added to give a polymer having a MFI of ca. 30. The product was tested as described above and the results are given in Table 7 below.

TABLE 1

| Ex. No. | Silica grade | MFI | Ti (ppm) | Cl (ppm) | Mg (ppm) | FM (GPa) | HHs (%) | BD (g·l$^{-1}$) |
|---|---|---|---|---|---|---|---|---|
| 1 | GD 952 | 10 | 8 | 23 | 7.0 | 1.44 | 2.9 | 468 |
| 2 | GD 332 | 21 | 7 | 26 | 6.7 | 1.53 | 2.8 | 471 |

TABLE 2a

| Ex. No. | carboxylic acid | DEP (wt %) | Ti (wt %) | Mg (wt %) | Cl (wt %) | SiO$_2$ (wt %) |
|---|---|---|---|---|---|---|
| 3 | cyclohexane | 2.0 | 4.4 | 3.7 | 18.2 | 71.8 |
| 4 | cycloheptane | 2.6 | 4.3 | 3.5 | 17.9 | 71.7 |
| 5 | cyclopentane | 2.0 | 4.3 | 3.5 | 18.1 | 72.1 |
| 6 | cyclobutane | 2.1 | 4.6 | 3.7 | 18.0 | 71.7 |
| 7 | cyclopropane | 1.4 | 4.4 | 3.7 | 18.0 | 72.5 |
| 8 | 1-methylcyclohexane | 1.5 | 5.0 | 3.8 | 19.3 | 70.4 |
| 9 | cyclohexylacetic | 1.7 | 4.4 | 2.5 | 15.1 | 76.3 |
| 10 | phenylacetic | 1.7 | 4.2 | 3.6 | 17.9 | 72.5 |
| 11 | 1,4-dihydro-2-methylbenzoic | 1.6 | 5.0 | 2.5 | 16.8 | 74.0 |
| 12 | no acid | 2.6 | 8.0 | 3.2 | 25.0 | 61.3 |

TABLE 2b

| Ex. No. | MFI | Ti (ppm) | Cl (ppm) | Mg (ppm) | FM (GPa) | HHs (%) |
|---|---|---|---|---|---|---|
| 3 | 37 | 9.0 | 30 | 7.4 | 1.57 | 1.8 |
| 4 | 19 | 9.0 | 35 | 8.0 | 1.43 | 1.4 |
| 5 | 20 | 6.0 | 20 | 5.0 | 1.63 | 1.4 |
| 6 | 5 | 11 | 45 | 10.7 | 1.47 | 1.2 |
| 7 | 19 | 22 | 80 | 18.8 | 1.55 | 1.6 |
| 8 | 20 | 17 | 50 | 11.5 | 1.46 | 2.6 |
| 9 | 17 | 15 | 56 | 9.4 | 1.48 | 2.1 |
| 10 | 15 | 21 | 91 | 20 | 1.54 | 1.2 |
| 11 | 17 | 21 | 91 | 20 | 1.54 | 1.2 |
| 12 | 41 | 38 | 103 | 17.5 | 1.08 | 14.5 |

TABLE 3

| Ex. No. | Temp. (°C.) | MFI | Ti (ppm) | Cl (ppm) | Mg (ppm) | FM (GPa) | HHs (%) | BD (g·l$^{-1}$) |
|---|---|---|---|---|---|---|---|---|
| 13 | 99 | 49 | 9 | 34 | 7.0 | 1.62 | 3.6 | 465 |
| 1 | 84 | 10 | 8 | 23 | 7.0 | 1.44 | 2.8 | 468 |
| 14 | 72 | 28 | 13 | 44 | 10.0 | 1.58 | 3.1 | 460 |

TABLE 4

| Ex. No. | Ester | MFI | Ti (ppm) | Cl (ppm) | Mg (ppm) | FM (GPa) | HHs (%) | BD (g·l$^{-1}$) |
|---|---|---|---|---|---|---|---|---|
| 15 | dimethyl phthalate | 27 | 7 | 29 | 7.1 | 1.59 | 2.2 | 459 |
| 1 | diethyl phthalate | 10 | 8 | 23 | 7.0 | 1.44 | 2.9 | 468 |
| 16 | di-iso-butyl phthalate | 32 | 7 | 24 | 6.0 | 1.44 | 1.9 | 490 |
| 17 | di-iso-octyl phthalate | 10 | 8 | 20 | 5.4 | 1.38 | 1.4 | 503 |

TABLE 5

| Ex. No. | Mg:DEP Ratio | MFI | Ti (ppm) | Cl (ppm) | Mg (ppm) | FM (GPa) | HHs (%) | BD (g·l$^{-1}$) |
|---|---|---|---|---|---|---|---|---|
| 18 | 3:1 | 10 | 15 | 47 | 10.7 | 1.42 | 3.3 | 475 |
| 19 | 5:1 | 13 | 9 | 34 | 8.1 | 1.59 | 1.2 | 510 |
| 1 | 7:1 | 10 | 8 | 23 | 7.0 | 1.44 | 2.8 | 468 |
| 20 | 10:1 | 29 | 6 | 19 | 5.6 | 1.48 | 2.0 | 485 |

TABLE 6

| Ex. No. | Silane | MFI | Ti (ppm) | Cl (ppm) | Mg (ppm) | FM (GPa) | HHs (%) | BD (g·l$^{-1}$) |
|---|---|---|---|---|---|---|---|---|
| 21 | i-Bu-i-Pr(OMe)$_2$silane | 27 | 6.4 | 19.5 | 5.2 | 1.58 | 1.6 | 480 |
| 22 | Ph$_2$(OMe)$_2$silane | 29 | 7.8 | 28.5 | 6.4 | 1.64 | 2.1 | 480 |
| 23 | i-Pr$_2$(OMe)$_2$silane | 18 | 7.6 | 25.4 | 6.2 | 1.62 | 1.4 | 465 |
| 24 | c-He$_2$(OMe)$_2$silane | 30 | 8.0 | 29.9 | 7.3 | 1.52 | 2.3 | 490 |
| 25 | c-Pe$_2$(OMe)$_2$silane | 13 | 6.3 | 23.8 | 5.9 | 1.55 | 1.1 | 475 |
| 26 | i-Bu$_2$(OMe)$_2$silane | 30 | 8.1 | 24.0 | 6.3 | 1.44 | 2.0 | 455 |
| 27 | Pr-(Ot-Bu)(OMe)$_2$silane | 21 | 7.7 | 24.7 | 6.0 | 1.47 | 1.7 | 480 |

TABLE 7

| Ex. No. | Ti (ppm) | Cl (ppm) | Mg (ppm) | Fm (GPa) | Xys (%) | Yield (kg·g$^{-1}$) (Cl) | Fines (%) |
|---|---|---|---|---|---|---|---|
| 28 | 4.5 | 16 | 6.6 | 1.35 | 3.1 | 15.7 | 2.8 |
| 29 | 6.1 | 24 | 7.5 | 1.41 | 2.2 | 10.4 | 4.2 |
| 30 | 5.8 | 23 | 7.1 | 1.36 | 3.1 | 10.9 | 1.4 |

I claim:

1. A method of making a polymer or copolymer of an unsaturated monomer wherein at least one unsaturated hydrocarbon monomer is contacted under polymerization conditions with a polymerization catalyst which is (A) the reaction product of:
   (i) a compound of transition metal of Group IVA of the Periodic Table;
   (ii) a silica support of high surface area and which comprises a compound of the general formula selected from the group consisting of (Ia):

$(RCOO)_2Mg$      (Ia)

deposited on its surface and/or groups of the general formula (Ib):

$R(CO_2MgO)_n-$      (Ib)

where
   R is a hydrocarbon radical, and
   n = 1 to 6;
   linked to surface silicon atoms, and
   (iii) a Lewis base of the general formula (III):

$R'_a Ar (COOR^2)_b$      (III)

where:
   Ar is a residue of an aromatic hydrocarbon;
   each R' independently is a hydrogen atom or a hydrocarbon radical, a halogen atom, or a group $OR^3$, (where $R^3$ is a hydrocarbon radical);
   each $R^2$ independently is a hydrocarbon radical;
   a is a zero or an integer;
   b is an integer;
(B) an organic compound of aluminium and/or a metal of group IIA of the Periodic Table; and
(C) a Lewis base compound which is an organic silicon compound containing one or more $SI-OR^4$, $Si-OCOR^4$ or $Si-NR^4$ bonds, where:
   each $R^4$ independently is a hydrocarbon radical which may be substituted with one or more halogen atoms and/or oxyhydrocarbon groups.

2. A method as claimed in claim 1 wherein the silica support is one with a surface which is substantially free from reactive hydroxyl groups, and in the general formulae (Ia) and (Ib) R is a hydrocarbon radical; and wherein n is 1.

3. A method as claimed in claim 2 wherein in the general formulae (Ia) and I(b) R is an aliphatic group having from 1 to 30 carbon atoms.

4. A method as claimed in claim 3 wherein in the general formulae (Ia) and (Ib) R is a cycloaliphatic group.

5. A method as claimed in claim 2 wherein the carboxylic acid group is the residue of one or more of cyclohexane, 1-methylcyclohexane, cycloheptane, cyclopentane, cyclobutane and cyclopropane carboxylic acids, cyclohexyl- and phenyl-acetic acids and 1,4-dihydro-2-methylbenzoic acid (2-methylcyclohexa-2,5-diene carboxylic acid), 6. A method as claimed in claim 2 wherein in the silica support the proportion of Mg is from 0.1 to 0.5 moles per mole of silica and the molar ratio of carboxylate groups to silica is from 1:5 to 1:1.

7. A method as claimed in claim 2 wherein the silica of the support has a particle size such that at last 90% of the particles have a diameter of from 10 to 500 μm; a surface area of from 100 to 1500 m².g$^{-1}$; a pore volume of from 1 to 5 ml.g$^{-1}$; and a (Calculated) average pore diameter of from 1 to 100 nm.

8. A method as claimed in claim 1 wherein the compound of a Group IVa metal is titanium tetra-chloride.

9. A method as claimed in claim 1 wherein the Lewis Base (III) is an ester of a benzene carboxylic acid.

10. A method as claimed in claim 9 wherein the Lewis bas (III) is a di-alkyl phthalate.

11. A method as claimed in claim 1 wherein component (B) is an organic magnesium compound, a complex of an organic magnesium compound and an organic aluminum compound or a complex of a group IA metal with an organic aluminum compound.

12. A method as claimed in claim 11 wherein component (B) is an aluminum tri-alkyl, said alkyl having 1 to 10 carbon atoms.

13. A method as claimed in claim 1 wherein component (C) is a dialkyl dialkoxy silane.

14. A method as claimed in claim 13 wherein component (C) is a di-alkyldimethoxysilane, said alkyl having 1 to 10 carbon atoms.

15. A method as claimed in claim 1 wherein the molar ratio or component (B) to transition metal in component (A) is from 1:1 to 250:1 and the molar ratio of component (C) to component (B) is from 0.01:1 to 0.5:1.

16. A method as claimed in claim 15 wherein the molar ratio of component (B) to transition metal in component (A) is from 10:1 to 60:1 and the molar ratio of component (C) to component (B) is from 0.05:1 to 0.4:1.

17. A method as claimed in claim 1 wherein the olefin is a least one alpha-olefinic monomer, having 2 to 10 carbon atoms.

18. A method as claimed in claim 1 wherein the olefin is a least one mono-olefin of the formula $CH_2=CHR^5$, where $R^5$ is a hydrogen atom or a hydrocarbon radical.

19. A method as claimed in claim 1 wherein the polymerization is the homopolymerization of propylene.

20. A method as claimed in claim 19 wherein the polymerization is carried out in the gas phase.

21. A method of making a polymer or copolymer of an unsaturated monomer wherein at least one unsaturated hydrocarbon monomer is contacted under polymerisation conditions with a polymerisation catalyst as claimed in claim 1.

22. A method as claimed in claim 21 wherein the olefin is at least one C2 to 10 alpha-olefinic monomer, particularly a mono-olefin of the formula $CH_2=CHR^5$ (where $R^5$ is a hydrogen atom or a hydrocarbon radical especially an alkyl, particularly a C1 to C8 and especially a methyl, group or an aryl, especially a phenyl, group), especially ethylene, butene-1, pentene-1, hexene-1, 4-methylpentene-1, styrene, 1,3-butadiene and very especially propylene.

23. A method of claim 21 wherein the polymerisation is the homopolymerisation of propylene.

24. A method as claimed in claim 21 wherein the polymerisation is carried out in the gas phase.

* * * * *